US009454000B2

(12) United States Patent
Gokita et al.

(10) Patent No.: US 9,454,000 B2
(45) Date of Patent: Sep. 27, 2016

(54) APERTURE DEVICE AND OPTICAL INSTRUMENT

(71) Applicant: SEIKO PRECISION INC., Narashino (JP)

(72) Inventors: Katsuhisa Gokita, Narashino (JP); Kazuya Shioda, Narashino (JP); Kenichi Kudo, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/311,707

(22) Filed: Jun. 23, 2014

(65) Prior Publication Data

US 2014/0300943 A1    Oct. 9, 2014

Related U.S. Application Data

(63) Continuation of application No. PCT/JP2013/050175, filed on Jan. 9, 2013.

(30) Foreign Application Priority Data

Apr. 24, 2012   (JP) .................................. 2012-99254

(51) Int. Cl.
*G02B 26/02*     (2006.01)
*G03B 9/06*      (2006.01)
(Continued)

(52) U.S. Cl.
CPC ................ *G02B 26/02* (2013.01); *G03B 9/06* (2013.01); *G03B 9/00* (2013.01); *G03B 9/02* (2013.01); *G03B 9/07* (2013.01); *G03B 9/08* (2013.01)

(58) Field of Classification Search
CPC .......... G02B 26/02; G02B 9/08; G02B 9/10; G02B 9/16; G02B 9/18; G02B 9/20; G02B 9/22; G02B 9/24; G03B 9/00; G03B 9/02; G03B 9/06; G03B 9/07
USPC ........ 359/227, 230, 234, 236; 352/204, 208, 352/214, 218, 220; 396/452, 458, 461, 493, 396/497, 505, 510; 250/232–233
See application file for complete search history.

(56) References Cited

U.S. PATENT DOCUMENTS

2006/0276072 A1\* 12/2006 Fukasawa ..................... 439/397
2010/0165488 A1    7/2010 Ishimasa
(Continued)

FOREIGN PATENT DOCUMENTS

CN    101866041 A    10/2010
JP    61121429       7/1986
(Continued)

OTHER PUBLICATIONS

International Search Report for International Application No. PCT/JP2013/050175 dated Apr. 16, 2013.
(Continued)

*Primary Examiner* — Scott J Sugarman
*Assistant Examiner* — Alberto Betancourt
(74) *Attorney, Agent, or Firm* — Kratz, Quintos & Hanson, LLP

(57) ABSTRACT

An aperture device includes: a board including an opening; a blade opening and closing the opening; and first and second receiving plates sandwiching the blade; wherein the first receiving plate includes a pressing portion partially pressing the blade toward the second plate.

8 Claims, 5 Drawing Sheets

(51) Int. Cl.
  *G03B 9/02* (2006.01)
  *G03B 9/00* (2006.01)
  *G03B 9/08* (2006.01)
  *G03B 9/07* (2006.01)

(56) References Cited

U.S. PATENT DOCUMENTS

2012/0170096 A1    7/2012  Kawamoto
2012/0194796 A1*   8/2012  Nakajima et al. ............ 359/642
2012/0287319 A1   11/2012  Ishimasa

FOREIGN PATENT DOCUMENTS

| JP | 2003-330060 A1 | 11/2003 |
|---|---|---|
| JP | 2007199307 A | 8/2007 |
| JP | 2009-31663 A1 | 2/2009 |
| JP | 200986305 A | 4/2009 |
| JP | 2011-107584 A1 | 6/2011 |
| JP | 201290245 A | 5/2012 |
| JP | H07-20530 | 6/2014 |
| WO | 2011/061986 A1 | 5/2011 |

OTHER PUBLICATIONS

Office Action of counterpart Japanese Patent Application No. 2012-099254, issued on Sep. 15, 2015.
Chinese Office Action, dated Apr. 5, 2016, for Chinese patent application No. 2013800060472, which is a counterpart to U.S. Appl. No. 14/311,707.
Japanese Office Action, dated Feb. 2, 2016, for counterpart Japanese patent application No. 2012-099254.

* cited by examiner

APERTURE DEVICE AND OPTICAL INSTRUMENT

CROSS-REFERENCE TO RELATED APPLICATION

This application is a continuation of and claims priority to International Patent Application No. PCT/JP2013/050175 filed on Jan. 9, 2013, which claims priority to Japanese Patent Application No. 2012-099254 filed on Apr. 24, 2012, subject matter of these patent documents is incorporated by reference herein in its entirety.

BACKGROUND (i) Technical Field

The present invention relates to aperture devices and optical instruments.

(ii) Related Art

Japanese Unexamined Patent Application Publication No. 2009-31663 discloses an aperture device in which a diameter of an opening formed in a board is adjusted by blades.

For example, when the blades stop in respective desired positions, the impact is applied to the aperture device, so the blades might be positionally displaced from the respective desired positions. In particular, when the blades stop in a non-energized state of a motor serving as a drive source for the blades, the above situation might occur. Further, in a case of using a stepping motor as the drive source, a rotor might stop in an unstable position because of the property of this motor. In such a case, the impact is applied to the aperture device, so the blade might be positionally displaced.

SUMMARY

It is therefore an object of the present invention to provide an aperture device and optical instrument suppressing positional displacement of a blade.

According to an aspect of the present invention, there is provided an aperture device including: a board including an opening; a blade opening and closing the opening; and first and second receiving plates sandwiching the blade; wherein the first receiving plate includes a pressing portion partially pressing the blade toward the second plate.

DETAILED DESCRIPTION

Figure 1:
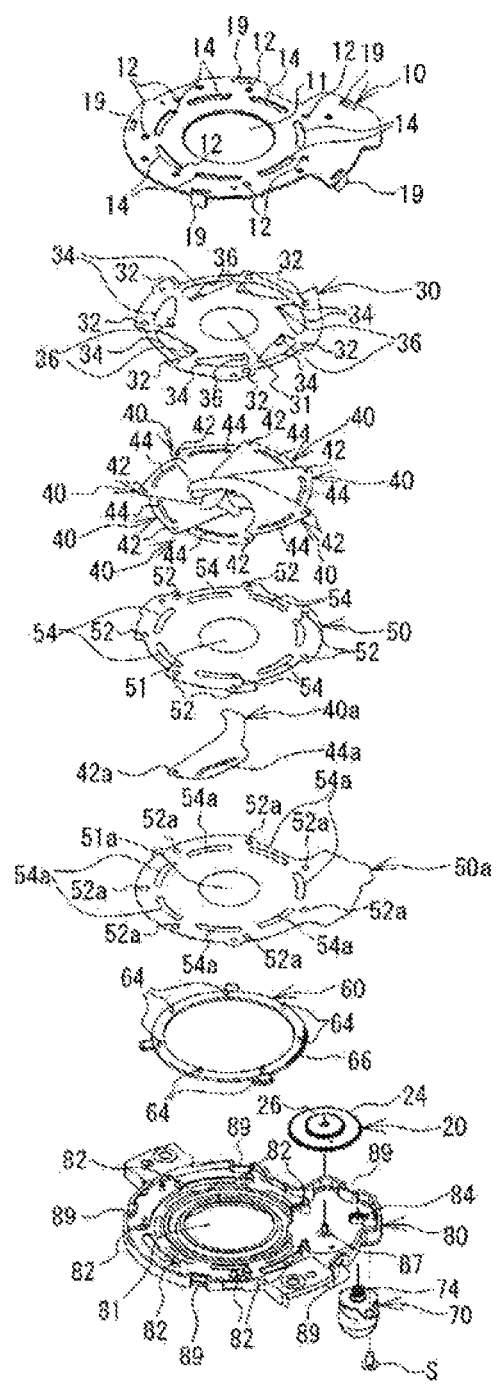
FIG. 1 is a perspective view of an aperture device according to the present embodiment.

FIG. 1 is a perspective view of an aperture device 1 according to the present embodiment. The aperture device 1 includes a board 10, a gear 20, a receiving plate 30, plural blades 40, a supporting blade 40a, receiving plates 50 and 50a, a drive ring 60, a stepping motor 70, and a board 80. The aperture device 1 according to the present embodiment is employed in a camera (optical instrument).

The gear 20, the receiving plate 30, the blades 40, the supporting blade 40a, the receiving plates 50 and 50a, the drive ring 60, and the stepping motor 70 are housed between the boards 10 and 80. The board 10, the receiving plates 30, 50, and 50a, and the board 80 are respectively formed with openings 11, 31, 51, 51a, and 81, for defining the optical path, at their centers. Additionally, each of the openings 31, 51, and 51a is smaller than each of the openings 11 and 81. The drive force of the stepping motor 70 is transmitted to the plural blades 40 and the supporting blade 40a via the gear 20 and the drive ring 60. They will be described later in detail.

When the drive force is transmitted to the blades 40, the plural blades 40 swing about given positions. The aperture diameters of the openings 11, 31, 51, 51a, and 81 are thus adjusted. The adjustment of the aperture diameters enables the adjustment of the amount of the object light entering an image pickup element installed in the camera. Further, the supporting blade 40a and the blades 40 bring the opening 11 into the fully closed state. Furthermore, the blades 40 are arranged between the receiving plates 30 and 50, and the supporting blade 40a is arranged between the receiving plates 50 and 50a. The receiving plates 30, 50, and 50a are so thin as to be deformed, and each of them has a sheet shape. Each thickness of the receiving plates 30, 50, and 50a is thinner than each thickness of the boards 10 and 80. The blades 40, the supporting blade 40a, and the receiving plates 30, 50, and 50a are made of the same material.

Figure 2:
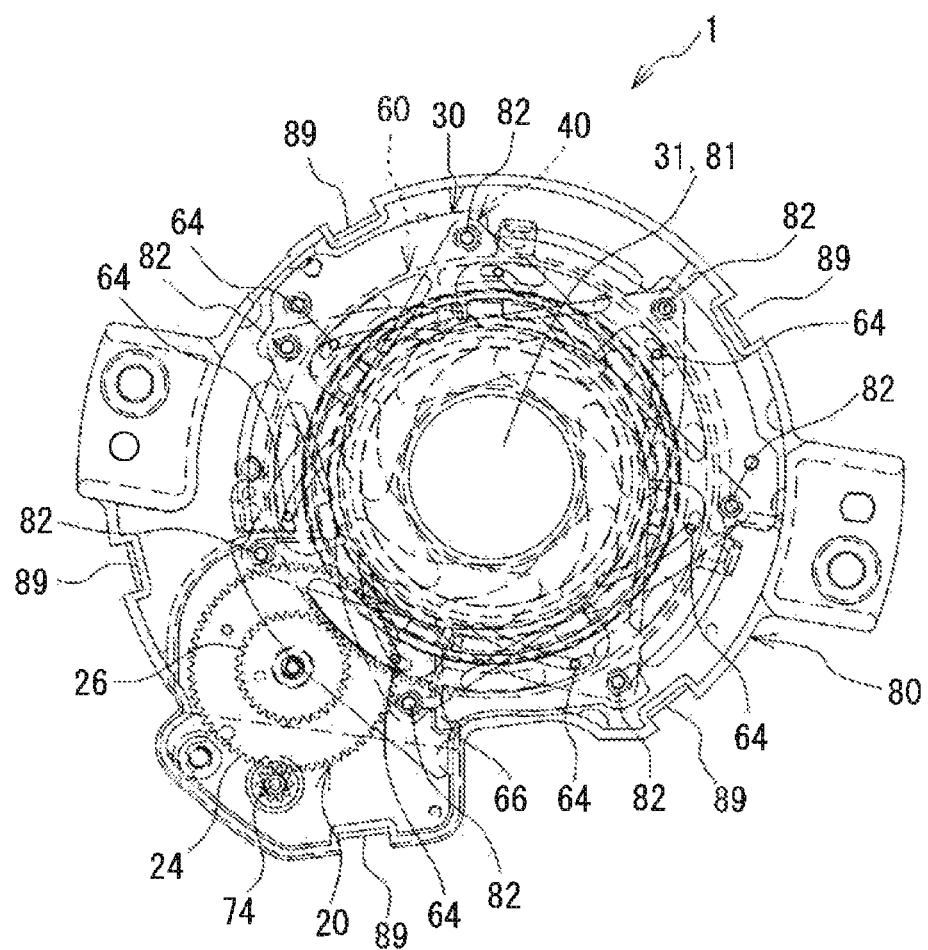
FIG. 2 is a front view illustrating an inner structure of the assembled aperture device according to the present embodiment.
Figure 3:
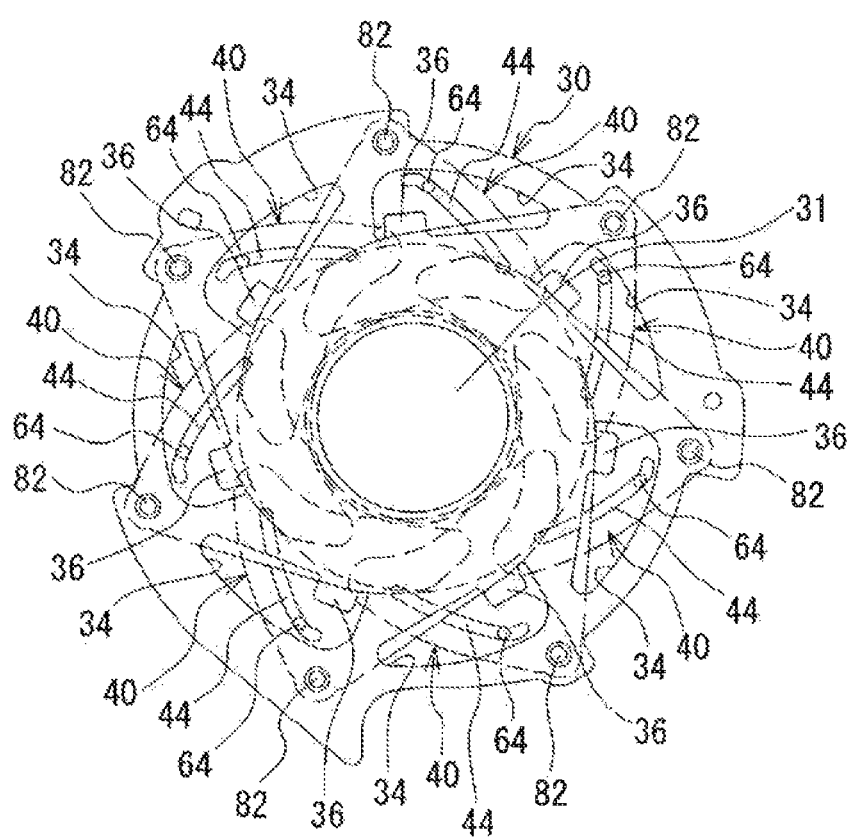
FIG. 3 is a view only illustrating a receiving plate and blades.
Figure 4:
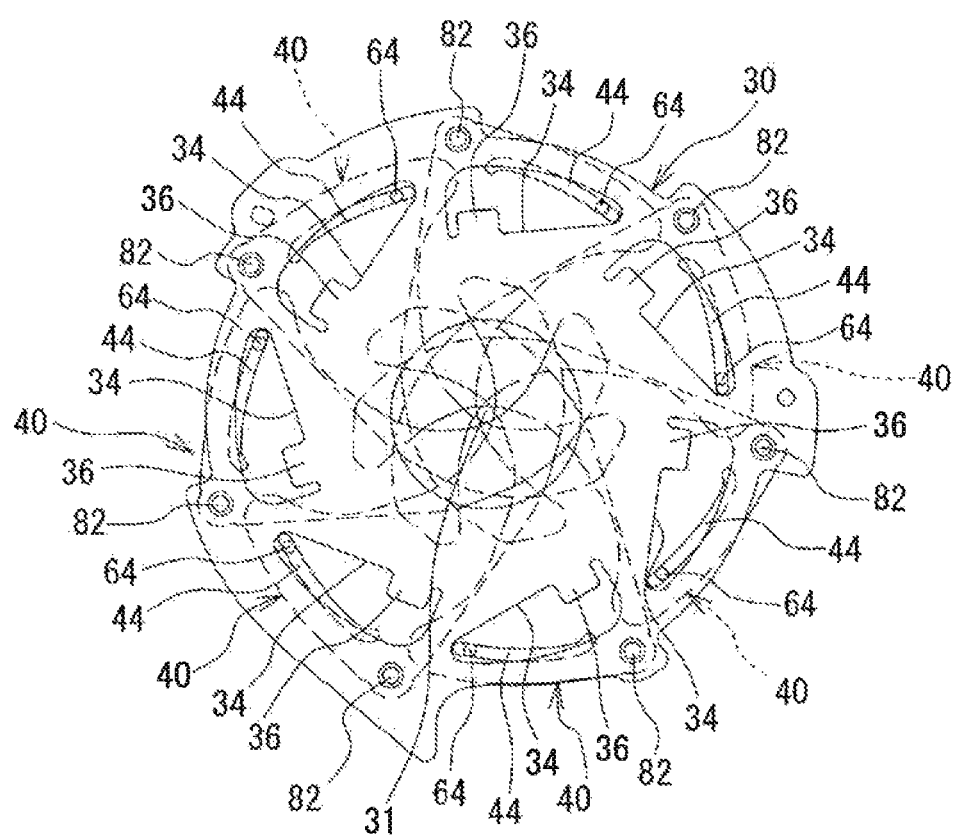
FIG. 4 is a view only illustrating the receiving plate and the blades.
Figure 5:
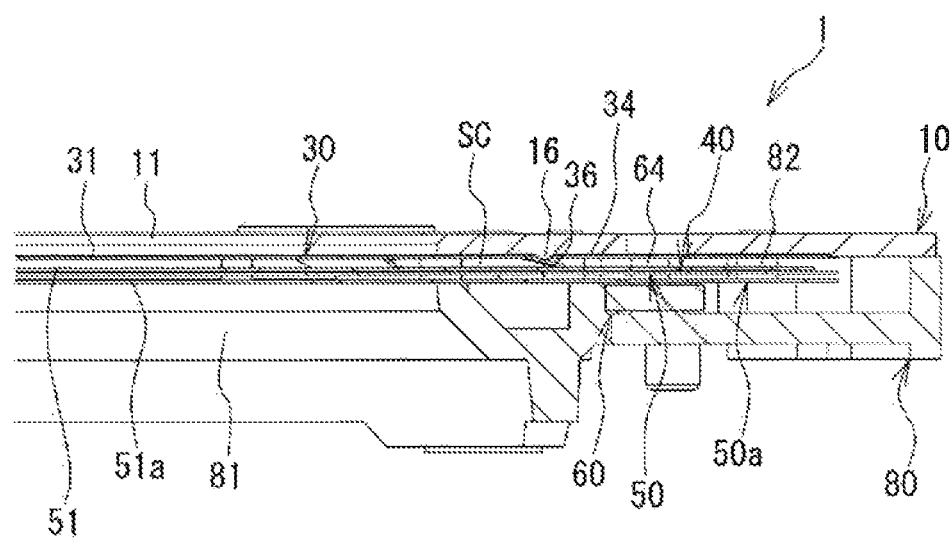
FIG. 5 is a sectional view of the aperture device.

FIG. 2 is a front view illustrating an inner structure of the assembled aperture device 1. Additionally, the board 10, the supporting blade 40a, and the receiving plates 50 and 50a are omitted in FIG. 2. In addition, FIG. 2 illustrates the fully opened state where the blades 40 recede away from the opening 51. FIGS. 3 and 4 only illustrate the receiving plate 30, the blades 40, drive pins 64 formed in the drive ring 60, and fixed spindles 82 formed in the board 80 mentioned later. FIG. 3 illustrates the fully opened state, and FIG. 4 illustrates a small aperture state. FIG. 5 is a sectional view of the aperture device 1.

As illustrated in FIG. 1, the board 80 is not provided with a motor chamber for housing the stepping motor 70. The board 80 is formed with a through hole 84, and the stepping motor 70 has a pinion gear 74 that is located in the inside of the board 80 through the through hole 84. Thus, the stepping motor 70 is secured to the outside of the board 80 by a screw S. Further, a blade chamber SC for housing the plural blades 40 is formed between the boards 10 and 80 as illustrated in FIG. 5.

As for the gear 20, a large diameter gear 24 and a small diameter gear 26 are concentric with each other. The diameter of the large diameter gear 24 is larger than that of the small diameter gear 26. The rotation of the pinion gear 74 of the stepping motor 70 causes the large diameter gear 24 to rotate, and the small diameter gear 26 rotates in response to this. A part of the drive ring 60 is formed with a teeth portion 66. The small diameter gear 26 meshes with the teeth portion 66 of the drive ring 60, so the rotation of the small diameter gear 26 causes the drive ring 60 to rotate. The drive ring 60 is formed with the drive pins 64 corresponding to the number of the blades 40. The drive pins 64 are formed on the drive ring 60 at substantially even intervals. The drive pins 64 engage respective cam slots 44 formed in the blades 40. Additionally, the blade 40 is formed with a spindle hole 42 as illustrated in FIG. 1, and the spindle hole 42 engages the fixed spindle 82 formed in the board 80. Accordingly, blades 40 are supported for swinging about the respective fixed spindles 82. In addition, a spindle hole 42a of the supporting blade 40a is swingably supported by one of the plural fixed spindles 82, and a cam slot 44a of the supporting blade 40a engages one of the drive pins 64. Therefore, the supporting blade 40a is swingably supported in the same way of the blades 40.

In addition, referring now to FIG. 1, the board 10, and the receiving plates 30, 50, and 50a are respectively formed with escape slots 14, 34, 54, and 54a that permit the movements of the drive pins 64. The board 10, the receiving plates 30, 50, and 50a are respectively formed with escape holes 12, 32, 52, and 52a into which the fixed spindles 82 are respectively inserted. Further, the outer periphery of the board 10 is formed with engagement pawls 19, and the outer periphery of the board 80 is formed with engagement portions 89 that respectively engage the engagement pawls 19. The engagement of the engagement pawls 19 with the engagement portions 89 assembles the aperture device 1.

When the drive ring 60 rotates clockwise in the fully opened state, the drive pins 64 move clockwise around the optical axis. In response thereto, the blades 40 swing about the fixed spindles 82 toward the center of the opening 51, which define the aperture diameter. In this way, the aperture diameter of the opening 51 is adjusted. Also, the controlling of the rotational position of the stepping motor 70 allows the continuous adjustment of the aperture diameter of the opening 51. Likewise, the supporting blade 40a also swings toward the center of the opening 51 in response to the rotation of the drive ring 60. Herein, unlike the blades 40, the supporting blade 40a is configured to cover the center position of the opening 51 only in the fully closed state thereof.

In addition, as mentioned above, each of the openings 31, 51, and 51a is smaller than each of the openings 11 and 81. Further, the openings 11 and 81 have a substantially identical diameter, and the openings 31, 51, and 51a also have a substantially identical diameter. Thus, the amount of light in the fully opened state is defined by the openings 31, 51, and 51a.

As illustrated in FIGS. 3 and 4, the receiving plate 30 is formed with a pressing portion 36 protruding from each of an inner edge of the escape slot 34. The receiving plate 30 is an example of a first receiving plate. The receiving plate 50 is an example of a second receiving plate. As illustrated in FIG. 5, the pressing portion 36 is pressed and bent by a protruding portion 16 formed in the board 10. The protruding portion 16 protrudes to the receiving plate 30 from an inner surface of the board 10 facing the receiving plate 30. The number of the protruding portions 16 is the same as that of the pressing portions 36, and the protruding portions 16 are provided to positionally correspond to the respective pressing portions 36.

As mentioned above, the pressing portions 36 partially press the respective blades 40 toward the receiving plate 50. In other words, the pressing portions 36 press the blades 40 in the optical axis direction, that is, in the thickness direction of the blades 40. This increases the sliding resistance of the blades 40 against the receiving plates 30 and 50. Thus, even when the impact is applied to the aperture device 1, the positional displacement of the blades 40 can be suppressed. Further, since the number of the pressing portions 36 is the same as that of the blades 40, the positional displacement of each blade 40 can be suppressed.

Additionally, the receiving plate 30 is thin so 30. as to be elastically deformable. Thus, the pressing portions 36 are elastically deformable. Further, since the pressing portion 36 is formed and protrudes from the inner edge of the escape slot 34, a root portion of the pressing portion 36 is elastically deformed with ease. This suppresses the abnormal driving of the blades 40 caused by too much pressing force of the pressing portions 36.

Also, since the pressing portions 36 are integrally formed in the receiving plate 30, the increase in the number of the parts is suppressed. Further, in the aperture device 1 according to the present embodiment, the blades 40, the supporting blade 40a, the receiving plates 30, 50, and 50a are made of the same material. Thus, even when the sliding resistance of the blades 40 increases, the damage to the blades 40 can be suppressed, and the cost of parts can be suppressed.

Moreover, the pressing portions 36 are pressed by the respective protruding portions 16 of the board 10 to press the respective blades 40. For example, in a case where the protruding portions 16 are not provided, since the pressing portions 36 are elastically deformable, the pressing portion 36 might not sufficiently press the respective blades 40. Further, the pressing portion 36 might not sufficiently press the respective blades 40, depending on the part accuracy of the receiving plate 30, the assembling accuracy of the aperture device 1, the posture of the aperture device 1 in using, or the environmental temperature of the aperture device 1 in using. In the present embodiment, the board 10 is configured such that the board 10 and the blades 40 sandwich the receiving plate 30, and the protruding portions 16 of the board 10 press the respective pressing portions 36 toward the blades 40, thereby suppressing such an above problem.

Additionally, as illustrated in FIGS. 3 and 4, the center of the opening 31 is closer to the pressing portion 36 than to the drive pins 64 and the fixed spindles 82. Therefore, the pressing portion 36 can press the vicinity of the center of the blade 40. As a result, the pressing of the pressing portion 36 prevents the blade 40 from partially lifting from the receiving plate 50.

Further, the pressing portions 36 are located away from the trajectories of the respective drive pins 64. Thus, the movements of the drive ring 60 and the blades 40 are not adversely influenced.

In the above embodiment, the pressing portion 36 presses the blade 40 to increase its sliding resistance, thereby suppressing the positional displacement of the blade 40. Herein, it is conceivable that the increase in the sliding resistance of the drive ring suppresses the positional displacement of the blade. However, in this case, a clearance between the drive ring and the blade might cause the positional displacement of the blade depending on the posture of the aperture device in using. In the present embodiment, the blades 40 defining of the aperture diameter are directly pressed, which suitably suppresses the positional displacement of the blades 40, enabling the aperture diameter to be kept even in the non-energized state.

Additionally, it is conceivable that the blade chamber SC is made narrow and the entire of the blades 40 abut the receiving plate 30 in order to increase the sliding resistance of the blades 40 against the receiving plate 30. However, in this case, since the entire of the blades 40 always abut the receiving plate 30, the sliding resistance becomes too much depending on the posture of the aperture device 1 in using, the environmental temperature of the aperture device I in using, or the variation in the accuracy of parts, so that the blades 40 might not normally drive. In the present embodiment, the pressing portion 36 presses the part of the blade 40, which suppresses such an above problem.

While the preferred embodiments of the present invention have been illustrated in detail, the present invention is not limited to the above-mentioned embodiments, and other embodiments, variations and modifications may be made without departing from the scope of the present invention.

In the above embodiment, the supporting blade 40*a* and the receiving plate 50*a* may be not provided. In the above embodiment, seven blades 40 are provided, but the number of the blades 40 is not limited. In the above embodiment, the board 10 is provided with the protruding portions 16, but the protruding portions 16 may be not provided.

In the above embodiment, at least the blades 40, and the receiving plates 30 and 50 are made of the same material. Further, the blade 40 may differ from the receiving plates 30 and 50 in material. For example, the blade 40 may differ from the receiving plates 30 in material in order to suppress the sliding resistance of the blade 40 against the pressing portion 36.

The receiving plate 50 may be provided with the pressing portion, and the blades 40 may be pressed toward the receiving plates 30. In this case, the supporting blade 40*a* and the receiving plate 50*a* may be not provided, and the board 80 may be provided with the protruding portion pressing the pressing portion of the receiving plate 50.

Finally, several aspects of the present invention are summarized as follows.

According to an aspect of the present invention, there is provided an aperture device including: a board including an opening; a blade opening and closing the opening; and first and second receiving plates sandwiching the blade; wherein the first receiving plate includes a pressing portion partially pressing the blade toward the second plate.

The pressing of the blade toward the second receiving plate increases the sliding resistance of the blade against the second receiving plate. Therefore, even when the impact is applied to the aperture device, the positional displacement of the blade can be suppressed.

According to another aspect of the present invention, there is provided an optical instrument including the above aperture device.

What is claimed is:

1. An aperture device comprising:
   a board including an opening;
   a blade opening and closing the opening; and
   first and second receiving plates sandwiching the blade;
   wherein the first receiving plate includes a pressing portion partially pressing the blade toward the second plate, wherein
   the first receiving plate includes an escape slot receiving a drive pin driving the blade, and
   the pressing portion protrudes from an inner edge of the escape slot.

2. The aperture device of claim 1, wherein
   the board is provided such that the board and the blade sandwich the first receiving plate, and
   the board includes a protruding portion pressing the pressing portion of the first receiving plate toward the blade.

3. The aperture device of claim 1, wherein a center of the opening is closer to the pressing portion than to the drive pin or a fixed spindle supporting the blade for swinging.

4. The aperture device of claim 1, wherein the pressing portion is elastically deformable.

5. The aperture device of claim 1, wherein
   a plurality of the blades are provided, and
   a plurality of the pressing portions are provided and the number of the plurality of the pressing portions correspond to the number of the plurality of the blades.

6. The aperture device of claim 1, wherein the blade and the first and second receiving plates are made of the same material.

7. An optical instrument comprising an aperture device comprising:
   a board including an opening;
   a blade opening and closing the opening; and
   first and second receiving plates sandwiching the blade;
   wherein the first receiving plate includes a pressing portion partially pressing the blade toward the second plate, wherein
   the first receiving plate includes an escape slot receiving a drive pin driving the blade, and
   the pressing portion protrudes from an inner edge of the escape slot.

8. An aperture device comprising:
   a board including an opening;
   a blade opening and closing the opening; and
   first and second receiving plates sandwiching the blade;
   wherein the first receiving plate includes a pressing portion partially pressing the blade toward the second plate, wherein
   the board is provided such that the board and the blade sandwich the first receiving plate, and
   the board includes a protruding portion pressing the pressing portion of the first receiving plate toward the blade.

* * * * *